Jan. 14, 1930.  J. HEIZENRETER  1,743,603
HOG HOUSE
Filed April 24, 1928   2 Sheets-Sheet 1

Inventor
J. Heizenreter
By Arthur H. Sturges,
Attorney

Jan. 14, 1930. J. HEIZENRETER 1,743,603
HOG HOUSE
Filed April 24, 1928 2 Sheets-Sheet 2

Inventor
J. Heizenreter
By Arthur H. Sturges,
Attorney

Patented Jan. 14, 1930

1,743,603

UNITED STATES PATENT OFFICE

JOSEPH HEIZENRETER, OF CULBERTSON, NEBRASKA

HOG HOUSE

Application filed April 24, 1928. Serial No. 272,482.

The present invention relates to improvements in hog houses, and has for an object to provide an improved hog house more particularly designed for use as a pig brooder, in which the construction is such as to avoid the crushing and smothering of the young pigs.

Another object of the invention is to provide an improved hog house in which adequate sun light and fresh air are admitted into the interior.

A further object of the invention is to provide, in conjunction with a hog house, a flexible door through which ingress and egress may be had, but which will normally seek a closed position and return to such closed position automatically after the passage of the animal.

A still further object of the invention is to provide a front wall construction of hog house, which will function as a wind-break allowing ample space in which the pigs may sun themselves.

It is a still further object of the present invention to provide a unitary house, which when used in conjunction with multiples thereof, will provide a series of brooding pens.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a perspective view of an improved hog house constructed according to the present invention.

Referring more particularly to the drawings, the improved hog house is preferably erected upon the spaced parallel runners 10, which project beyond the front of the house where the ends thereof are beveled, as indicated at 11 to facilitate drawing the devices over the ground, as by the use of chain-hooks engaging in the perforations 12 made in the projecting ends of said runners. The runners are also provided with perforations 13 spaced from the perforations 12 for a purpose later described.

Figure 3:
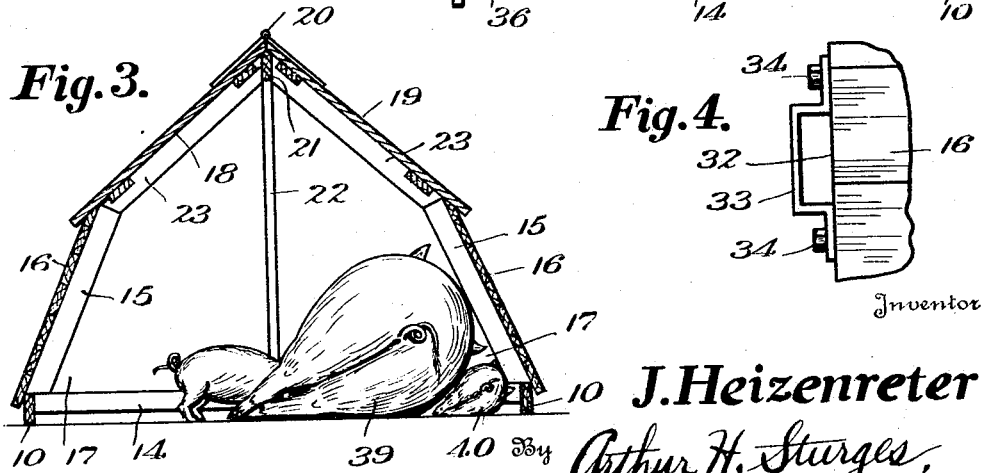
Figure 3 is a vertical section taken through the improved hog house.
Figure 4:
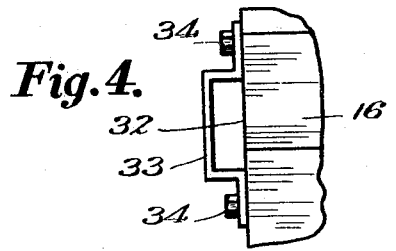
Figure 4 is a fragmentary portion of the house showing the rail supporting cleat.

The runners 10 are connected together, as by the transverse sills 14 to provide a bottomless structure, as shown in Figure 3. The side walls are made up of the studding 15 and the side boards 16, nailed or otherwise secured to the studding. These side walls incline upwardly and inwardly to provide protected under spaces 17. The roof is preferably of substantially inverted V-shape including the sloping sections 18 and 19 which are hinged together, as at 20, above the ridge pole 21, which is supported by the standards or posts 22. The rafters 23 for supporting the roof sections extend from the upper ends of the studdings 15 to the ridge pole 21.

Figures 5, 6:
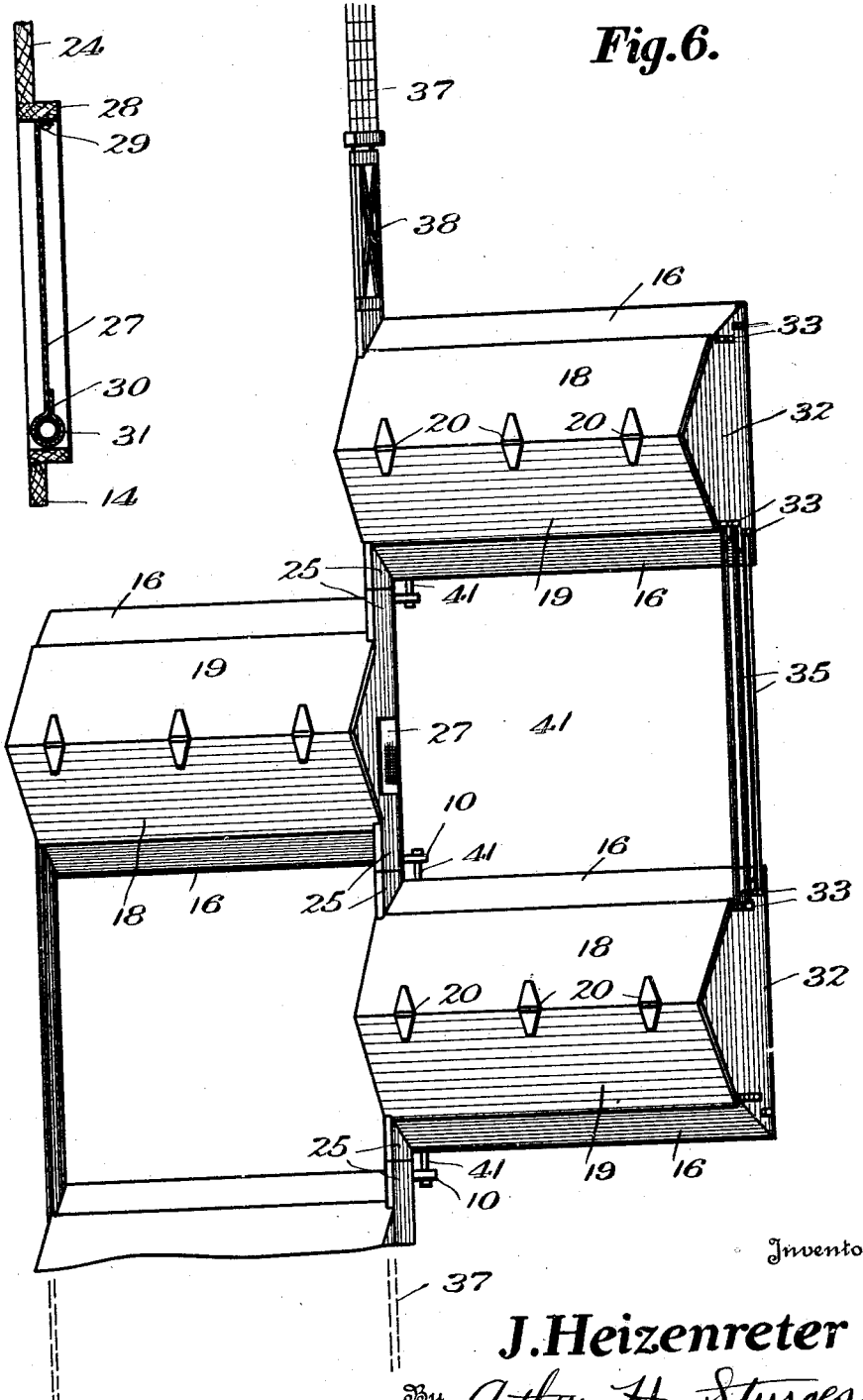
Figure 5 is a vertical section taken through the door opening and the improved door structure.
Figure 6 is a perspective view showing the series arrangement of the houses with the intermediate pig brooding pens.

The front wall 24 is made preferably with a substantially rectangular portion having the projecting end parts 25 extending beyond the confines of the side walls 16 and adapted to engage the projecting portions of the similar walls of other houses, as indicated in Figure 6. The front walls are also provided with the door openings 26 through which the hogs may pass into and out of the enclosure. These openings are closed by doors which are preferably flexible.

As shown in Figure 5 the door 27 is of flexible canvas and is secured at its upper end to the top of the door opening or sill 28, as by the use of nails or other fastenings 29. The lower end of the canvas is formed into a tubular casing 30 to enclose the pipe 31 which is suspended by the canvas, acts to hold the same taut and to restore the door to the closed position after the passage of the animal. This weighted door will also resist opening movement caused by wind.

Figure 2:
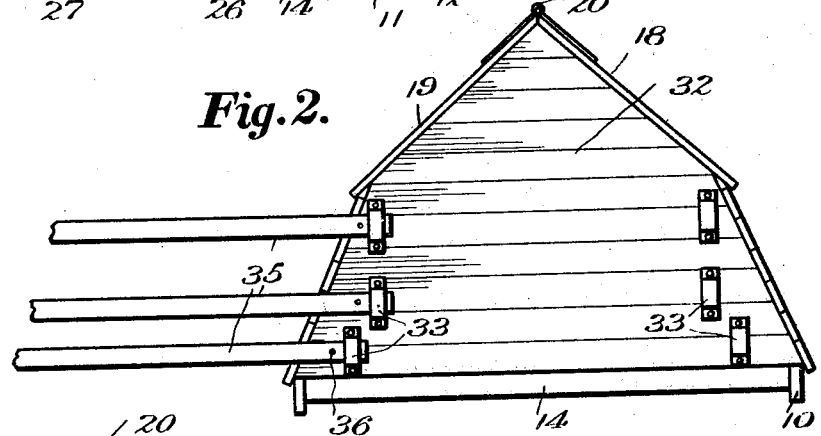
Figure 2 is an end view of the same.

The rear wall 32 of the house is shown in Figure 2, as being provided with numbers of cleats or substantially U-shaped straps 33 secured as by the bolts or other fastenings 34 and being adapted to receive the ends of the rails 35 extending between adjacent houses. The rails 35 are provided with the pins 36 or other locking devices to hold them in the straps and to prevent their escape.

In the use of the device, assuming that an individual brooder is to be used, the same is placed on the ground in a desired location, and, since the projecting portions 25 of the front wall are vertical, they may be located in alinement with a wire fence 37 and a gate 38, as indicated in Figure 6. The gate 38 may be attached to one of the projecting parts 25 and the fence continued from the opposite side of the gate; while at the opposite side of the house, the fence may be secured to the opposite projecting portion 25 of the front wall of the hog house; in this way providing a hog and pig run within the enclosure formed by said fence.

As best shown in Figure 3, it will be noted that the hog, indicated at 39, in lying down is prevented from filling the space 17, occupied by the small pig 40, the formation of the inwardly and upwardly inclined side walls 16, preventing the hog from crushing and smothering the pig. The elongated shape of the front rectangular wall constitutes a wind-break and provides an extended protected space where the young pigs may sun themselves.

As shown in Figure 6, a series of individual brooders may be placed in staggered, or zig-zag relation with each other and in a manner whereby the front vertical walls 25 may abut against each other, and thus form a continuous wall.

When so arranged bolts 41 are passed through the apertures 12 and 13 in the runners for preserving the alinement and for locking the individual brooders together. When so arranged, the rails 35 may be placed through the cleats 33 and secured, thus forming individual pig pens 41 between the houses on three sides and the bars 35 on the fourth side. This arrangement is particularly of advantage in breeding certain classes of prize stock, when it is desirable that the young pigs will be prevented from nursing from other than their mother.

Figure 1:
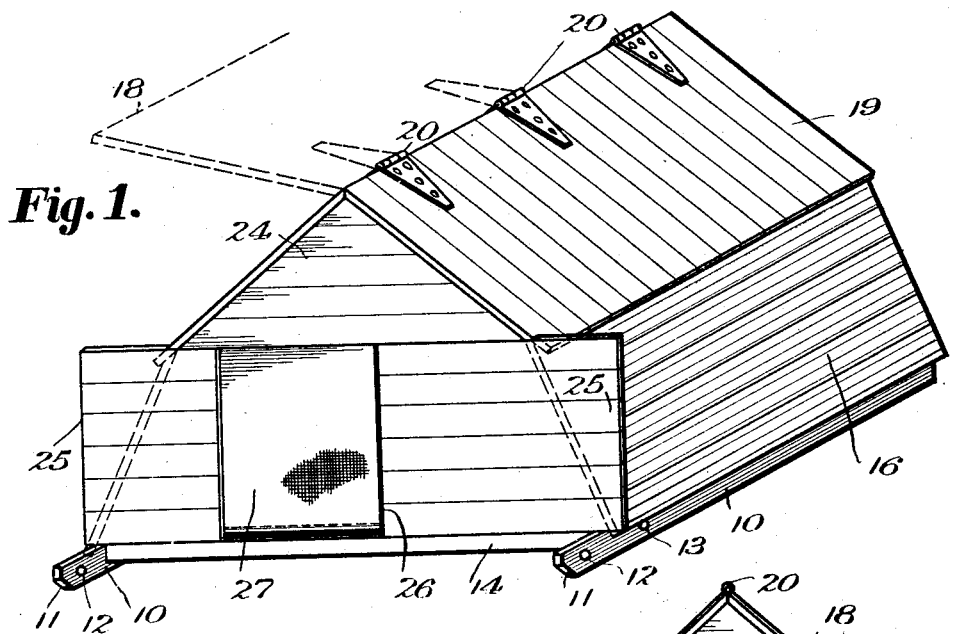

As shown in Figure 6, the fence 37 may be continued at both ends in alinement with the end walls 25 and the gate 38 may be provided at a suitable location. Adjacent brooders open in the opposite fields or runways at opposite sides of the fence 37 and in this manner individual accommodation is provided for occupants of each brooder of a series; while at the same time an attendant may pass through the gate 38 for raising and lowering the ventilating roofs 18 and 19 or for distributing food. The raised position of one of the roof sections 18 is indicated in dotted lines in Figure 1, whereby air and sunlight may be admitted to the interior of the house. The brooders are preferably open bottomed, as indicated in Figure 3, to allow the pigs to rest directly upon the ground, within the same, which is conducive to warmth and health.

When the ground becomes worn or unduly covered with foreign substances, the device may be readily moved to a new location and reassembled.

I do not wish to be restricted to the size, form, and proportions of the various parts, and obviously changes could be made in the construction herein described without departing from the spirit of the invention, it being only necessary that such changes fall within the scope of the appended claim.

What is claimed is:

An improved hog house comprising runners extending beyond one end of the house and having beveled ends and perforations adjacent the beveled ends, means of ingress and egress for the houses, substantially rectangular end walls for the houses at the projecting ends of the runners for extending beyond the sides of the houses to engage the projecting portions of the end walls of adjacent houses which are assembled in alternate series, means engaging with the perforations in said runners for joining the houses together, and means carried by the ends of the houses opposite to said rectangular end walls for forming pens in the spaces between adjacent houses.

In testimony whereof, I have affixed my signature.

JOSEPH HEIZENRETER.